W. H. SCUDDER.
Apparatus for Pickling Hams.
No. 224,848. Patented Feb. 24, 1880.
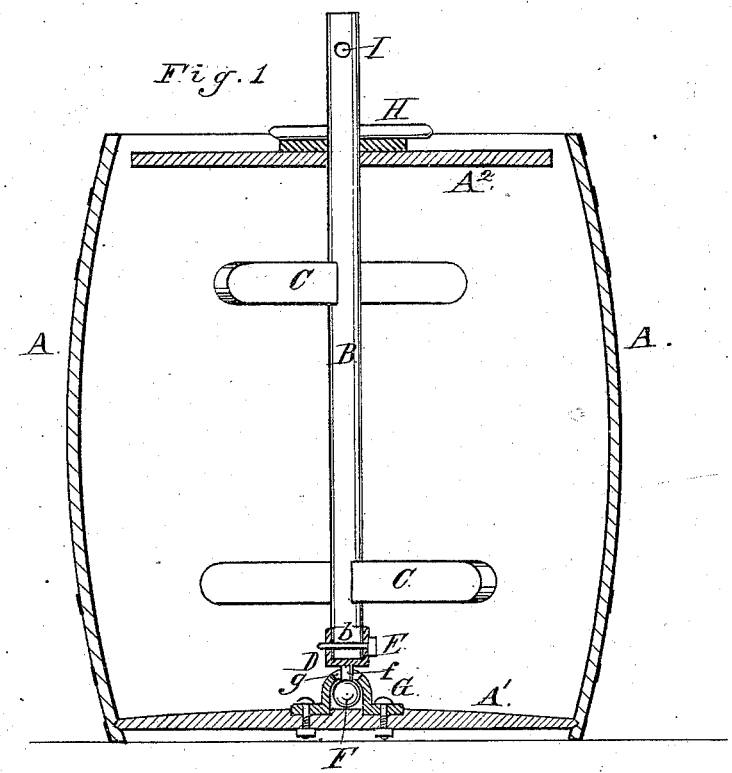
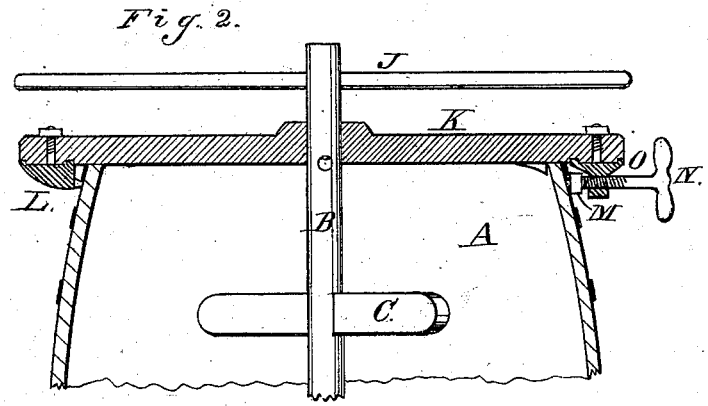

UNITED STATES PATENT OFFICE.

WILLIAM H. SCUDDER, OF ST. LOUIS, MISSOURI.

APPARATUS FOR PICKLING HAMS.

SPECIFICATION forming part of Letters Patent No. 224,848, dated February 24, 1880.

Application filed October 10, 1879.

*To all whom it may concern:*

Be it known that I, WILLIAM H. SCUDDER, of the city of St. Louis, in the State of Missouri, have invented a certain new and useful Improvement in Apparatus for Pickling Hams, &c., of which the following is a full, clear, and exact description, reference being had to the accompanying drawings, forming part of this specification.

The invention relates to certain improvements in apparatus for use in treating hams or other meat while in pickle, to insure the equal treatment of the whole of the articles contained therein, as will be hereinafter described.

The usual process of pickling hams is to place them under pickle in barrels or tubs, and, at stated times, to remove all the hams from barrel to barrel, and to purify the pickle at such times where necessary. This process involves the expenditure of so much time and hard labor that changes are made as seldom as is consistent with safety to the hams, and it is often found that while the pickle at the bottom is fully saturated with the salt, &c., the pickle at and near the top is not fully saturated and the upper courses of hams are not curing properly. In such cases the pickle may have become partially spoiled.

Under the old process of curing hams it took fifty men to do the work which one man can do now in the same time; hence the cost of stirring the hams often was too great. When hams are not stirred often it takes much longer for them to cure, because they lie very close together in the pickle and the pickle cannot get between them. When the pickle stands for some time without being thoroughly agitated the salt in the brine or pickle (which has to be stronger than 12°) sinks to the bottom, leaving the brine on top not sufficiently impregnated with salt; so of course it must take a greater time for the hams on top to cure than it would were the brine kept of uniform strength. For this last reason the hams and brine or pickle are often spoiled. When the salt leaves the pickle at the top of the cask and sinks to the bottom the pickle and hams on top will both spoil for want of salt, while the hams at bottom are also spoiled by being too largely impregnated with salt. The hams in the center are, in such case, the only ones properly cured. By stirring so often (which can be done every day or two with the present device) the pickle is maintained of equal strength at top and bottom. Under the old process it took seventy-five days to perform the operation of pickling, and then a great many hams were spoiled, for the reasons above given.

By the method hereinafter described the hams can be cured in twenty days, and every ham cured alike. The pickle is kept at a uniform temperature at all parts by the constant stirring of the contents—a great desideratum, because in the ordinary methods practiced the pickle often varies in temperature at different elevations in the barrel.

In the drawings, Figure 1 is a vertical section of the apparatus. Fig. 2 is a similar view of the upper portion, showing the parts in position for the turn of the shaft and the stirring of the hams and pickle.

A is the cask or other vessel. This is preferably circular, so that there will be no vertical corners which would interfere with the turning of the hams. B is a vertical shaft in a position axial to the cask A, and provided with arms C, which may extend horizontally and radially from the shaft.

There may be any suitable number of the arms C. The purpose of the arms is to move the mass of hams in the cask and to stir and mix up the pickle. The purpose of moving the hams among one another is to give the pickle full access to all parts of the hams. In some cases the hams may be pressed so tightly together as to materially interfere with the access of the pickle to parts of the hams, and it is necessary that the hams should be moved relatively to each other to allow the pickle to act. The purpose of stirring the pickle is to mix all parts of it thoroughly together, so that it shall be of a uniform strength and temperature in all parts of the barrel. This uniformity (not usually obtained under the ordinary modes of procedure) is quite necessary in the curing of high-grade hams, where it is required that the hams should have uniform and proper degree of saltness and fine flavor.

The lower end of the shaft B is connected to the bottom A' of the cask by a ball-and-socket joint, which allows the shaft to be turned freely, and also allows the shaft to be inclined to any side, and which prevents the shaft being lifted up by the flotative effect of the hams beneath the lid, so that the shaft supplies a means for holding down the lid $A^2$. The shaft has at the bottom a socket, D, in which the lower end, $b$, of the stem fits, and in which it is held by a pin, E, passing through the socket and the stem.

F is a ball, forming one member of the ball-and-socket joint, and connected to the socket D by a neck, $f$. G is the socket member of the ball-and-socket joint, and this is firmly attached to the bottom $A'$ of the cask. $g$ is the orifice in which the neck $f$ works. This orifice is made sufficiently large to allow the top of the shaft B to be leaned over against the side of the cask, when the cask is empty, without straining the parts.

The lid $A^2$ is for the purpose of holding down the hams beneath the pickle. The lid is held down by a pin, H, which passes through the shaft B. I is a hole, into which a bar, J, is passed, (see Fig. 2,) to give means for the turning of the shaft B.

When the shaft B is to be turned, the pin H is drawn out and the head $A^2$ lifted from the cask. Then a diametric bearing-bar, K, Fig. 2, is placed over the shaft B, and rests upon the top of the cask, and is clamped to the chine by claws L and M, or by other suitable means.

The claw L is fixed to one end of the bar K. The claw M is upon one end of the hand-screw N, screwing in bracket O, attached to the end of the bearing-bar K. The shaft extends through a journal-hole in the middle of the bar K, which thus forms the upper bearing of the shaft.

When the lid $A^2$ is taken off the mass of hams rises, and when the shaft B is turned the relative positions of the hams are changed and the pickle is mixed in the cask or other vessel, as the case may be.

The described method of stirring the contents without moving the cask enables me to make fixed pipe-connections for the outflow and inflow of pickle, by which much labor may be saved.

I claim as my invention—

1. The combination, with the pickle-cask A and shaft B, of the ball-and-socket joint F G, for the purpose set forth.

2. The combination of cask A, shaft B, with socket-joint F G, connecting with the cask bottom, removable head $A^2$, and pin H, or equivalent means for holding down the head, for the purpose set forth.

WILLIAM H. SCUDDER.

Witnesses:
SAML. KNIGHT,
GEO. H. KNIGHT.